United States Patent
Roedel

(10) Patent No.: US 10,350,942 B2
(45) Date of Patent: Jul. 16, 2019

(54) SINGLE WHEEL CASTER

(71) Applicant: STEINCO Paul vom Stein GmbH & Co. KG, Wermelskirchen (DE)

(72) Inventor: Thorsten Roedel, Wermelskirchen (DE)

(73) Assignees: STEINCO Paul vom Stein GmbH, Wermelskirchen (DE); MAGNUS MOBILITY SYSTEMS, INC., Irvine, CA (US)

( * ) Notice: Subject to any disclaimer, the term of this patent is extended or adjusted under 35 U.S.C. 154(b) by 0 days.

(21) Appl. No.: 14/624,719

(22) Filed: Feb. 18, 2015

(65) Prior Publication Data

US 2015/0239289 A1    Aug. 27, 2015

(30) Foreign Application Priority Data

Feb. 27, 2014 (DE) .................. 10 2014 002 610

(51) Int. Cl.
| | |
|---|---|
| *B60B 33/02* | (2006.01) |
| *B60B 33/00* | (2006.01) |
| *B60B 7/00* | (2006.01) |
| *B60B 7/02* | (2006.01) |

(52) U.S. Cl.
CPC ...... *B60B 33/0081* (2013.01); *B60B 33/0028* (2013.01); *B60B 33/0086* (2013.01); *B60B 33/02* (2013.01); *B60B 33/021* (2013.01); B60B 7/0073 (2013.01); B60B 7/02 (2013.01); B60B 33/025 (2013.01); B60B 2900/113 (2013.01); *Y10T 16/195* (2015.01)

(58) Field of Classification Search
CPC . B60B 33/0078; B60B 33/0086; B60B 33/02; B60B 33/021; B60B 33/025; B60B 33/0015; B60B 33/00; B60B 33/18; B60B 33/78; B60B 33/0002; B60B 33/0005; B60B 33/0023; B60B 33/0039
See application file for complete search history.

(56) References Cited

U.S. PATENT DOCUMENTS

| | | | | |
|---|---|---|---|---|
| 1,285,142 | A * | 11/1918 | Happensack | ........... B60B 33/00 16/18 CG |
| 6,532,624 | B1 * | 3/2003 | Yang | ................... B60B 33/0002 16/35 D |
| 7,143,472 | B2 * | 12/2006 | Hicks | ........................ B60B 7/00 16/18 CG |

(Continued)

*Primary Examiner* — Emily M Morgan
(74) *Attorney, Agent, or Firm* — Von Rohrscheidt Patents

(57) ABSTRACT

The invention relates to a single wheel caster with a support element including a top element and a base element which includes at least one support arm, wherein the base element receives at least one hub for a wheel, wherein a thread protector is arranged on the hub, wherein a fixation device is arranged between the wheel and the support element. It is an object of the invention to provide a novel single wheel caster with substantially reduced assembly complexity. The object is achieved in that the locking device is arranged without additional fastening elements in an interior of the support element between at least one inner surface of the support element and at least on contact surface arranged rotationally fixated at the wheel, wherein the contact surface firmly contacts the locking device when the caster is assembled.

8 Claims, 10 Drawing Sheets

(56) References Cited

U.S. PATENT DOCUMENTS

| | | | |
|---|---|---|---|
| 8,973,217 B2* | 3/2015 | Weichbrodt | B60B 33/0042 16/35 R |
| 2006/0236501 A1 | 10/2006 | Chou | |
| 2007/0056141 A1* | 3/2007 | Armano | B60B 33/0021 16/35 R |
| 2007/0119661 A1* | 5/2007 | Chang | A45C 5/145 188/1.12 |
| 2011/0083298 A1* | 4/2011 | Yan | B60B 33/0021 16/31 R |
| 2013/0097804 A1* | 4/2013 | Weichbrodt | B60B 33/0042 16/47 |

\* cited by examiner

SINGLE WHEEL CASTER

RELATED APPLICATIONS

This application claims priority from and incorporates by reference German patent application 10 2014 002 610.8 filed on Feb. 27, 2014.

FIELD OF THE INVENTION

The invention relates to a single wheel caster with a support element essentially including a top element and a base element which includes at least one support arm wherein the base element includes at least one hub for a wheel, wherein a thread protector is arranged on the hub and a fixation device is arranged between the wheel and the support element.

BACKGROUND OF THE INVENTION

A single wheel caster of this general type is known for example from DE 20 2011 005 192 U1 co-owned by applicant.

Casters of this type and other types are typically completely mounted in a factory and then have to be attached at a later point in time at hospital beds, medical equipment of similar. When mounting a completely delivered caster there are problems over and over again in practical applications where an installation space between wheel and support element for arranging attachment bolts is very small so that it is even difficult and time consuming with specially adapted tooling to attach the complete caster at a rolling frame or similar. This generated the idea to sell casters in a kit.

BRIEF SUMMARY OF THE INVENTION

Thus, it is an object of the present invention to provide a new single wheel caster which significantly reduces assembly complexity.

The object is achieved by a single wheel caster with a support element, the support element comprising a top element; and a base element which includes at least one support arm, wherein the base element receives at least one hub for a wheel, wherein a thread protector is arranged at the hub, wherein a locking device is arranged between the wheel and the support element, wherein the locking device is arranged without additional fastening elements in an interior of the support element between at least one inner surface of the support element and at least one contact surface arranged rotationally fixated at the wheel, and wherein the at least one contact surface firmly contacts the locking device when the caster is assembled.

The single wheel caster according to the invention is advantageous in that a locking device can be arranged in the interior of the support element without additional fasteners with low force application so that it is ready to operate. This simplifies assembly of the single wheel caster significantly for a user and improves the options to distribute this caster as a kit.

In one embodiment of the invention the contact surface associated with the wheel is arranged at the thread protector which provides an additional function to the thread protector in a simple manner.

An advantageous embodiment of the invention is wherein the locking device is simultaneously made from a wheel locking device and/or a directional locking device.

In an advantageous embodiment the locking device is formed by a holder, a locking element and a locking lever, wherein the locking element and the locking lever are interlocked at the support without an additional fastener element. This embodiment has the advantage that the locking device can be assembled in a very simple manner from three components that are interlockable with each other.

Further advantages may be derived from the fact that the locking device can also be attached also without additional fastener elements between the support element and the thread protector solely by mounting the wheel at the support element.

Eventually a particularly advantageous embodiment of the invention includes support arms which respectively include a support coulisse for the locking device wherein the locking device is partially insertable into an interior of the support element in a portion of the coulisse and wherein the locking device is moveable into a defined end position by a pivot movement along the support coulisse. Through this very simple option to associate the locking device and the support element it is further simplified for a user to mount the locking device in the support element.

BRIEF DESCRIPTION OF THE DRAWINGS

Further advantages of the invention can be derived from a subsequent description of advantageous embodiments of the invention with reference to drawing figures, wherein:

FIG. 6 illustrates a view according to FIG. 3 with an additional cover snap locked on;

DETAILED DESCRIPTION OF THE INVENTION

Figure 1:
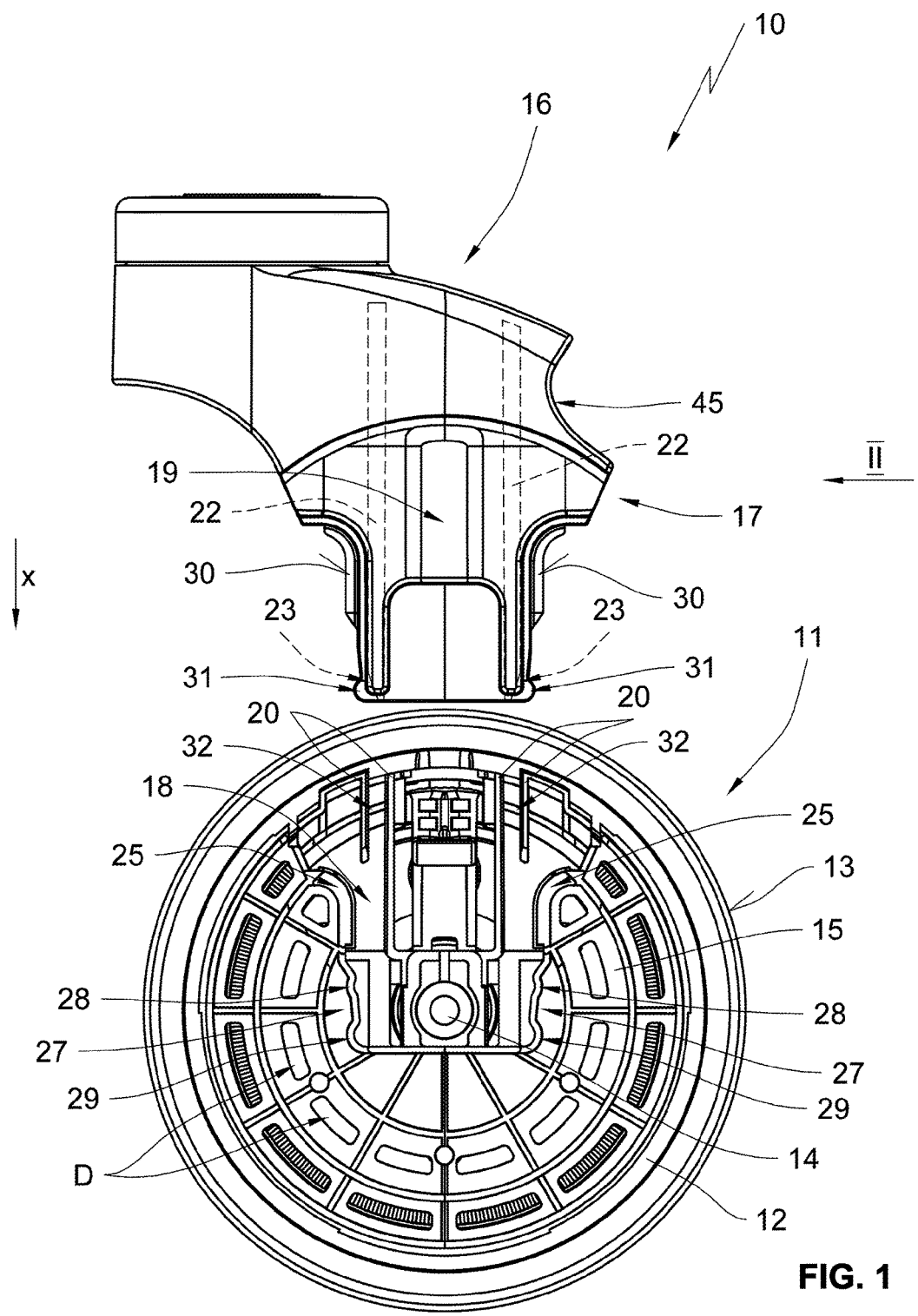
FIG. 1 illustrates a side view of a support element and a wheel of a single wheel caster in an exploded depiction.

In the drawing figures the single wheel caster is designated overall with reference numeral 10.

Figure 2:
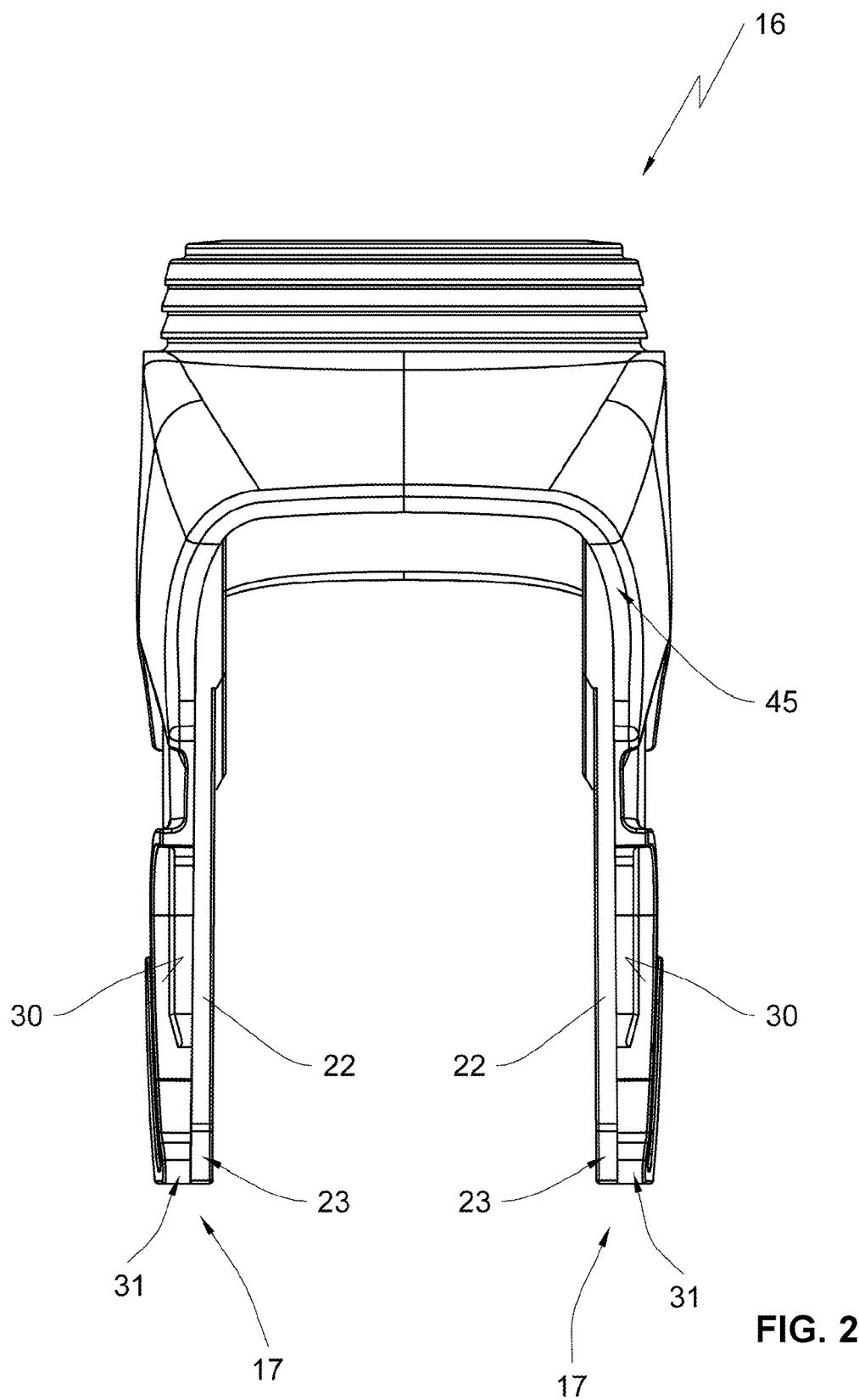
FIG. 2 illustrates a frontal view of the support element according to the view arrow II in FIG. 1.

As illustrated in FIGS. 1 and 2 the single wheel caster 10 includes a wheel 11 with a wheel rim 12 which is provided with an integrally molded running surface 13. In the portion of the wheel axle 24 (cf. FIG. 5) the wheel 11 is provided with a solid thread protector 15 using an attachment rivet 14.

Additionally the single wheel caster 10 is formed by a support element 16 which includes two support arms 17.

The thread protector 15 respectively arranged on both sides of the rim 12 is provided with numerous material saving pass through openings D and respectively includes an attachment portion 18. Additionally the support arms 17 are respectively provided with a so called opposite attachment portion 19.

Figure 8:
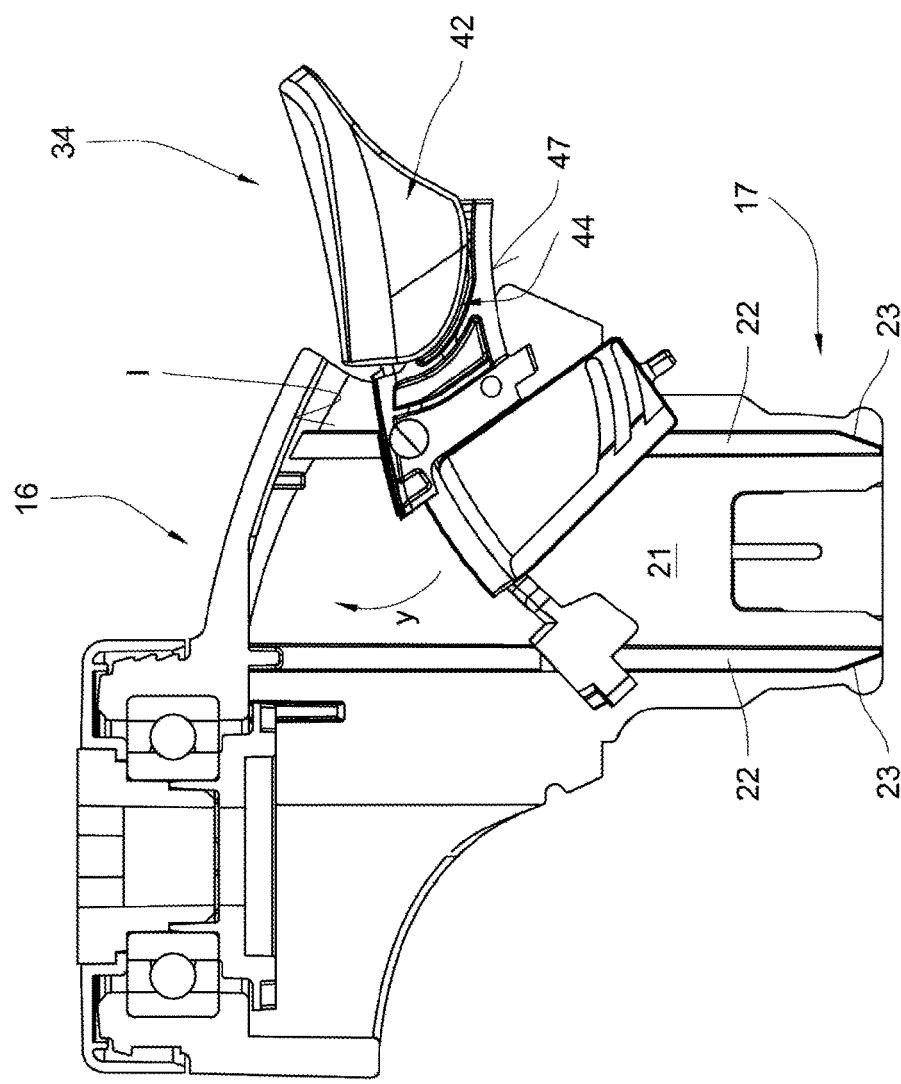
FIG. 8 illustrates a sectional view of the support element and the locking device at a beginning of assembly.

The attachment portion 18 of each thread protector 15 includes offset support ribs 20 which are used for controlled insertion of support bars 22 arranged at an inside 21 of the support arms 17 wherein end portions of the support bars 22 oriented towards the wheel 11 have insertion bevels 23 (cf. FIG. 8).

Significantly offset above a wheel axle 24 curved undercut portions 25 are arranged on both sides adjacent to the support ribs 20. Simultaneously a wheel hub element N includes another undercut portion 26 configured as a protruding collar respectively protruding on both sides parallel to an insertion direction x of the opposite attachment portion 19 into the attachment portion 18.

Furthermore, the attachment portion 18 is provided on both sides with a support contour 27 which extends respectively from a lower edge of the wheel hub N to the undercut portion 25. The support contours 27 are specifically configured spring elastic and include a preliminary locking positon 28 and a finial locking position 29 which will be described infra.

The opposite attachment portion 19 of the support arms 17 is provided on both sides with curved locking surfaces 30 and additionally provided with a respective interlocking protrusion 31 on both sides at an end portion oriented towards the edge 11.

FIGS. 1-5 individually illustrate the assembly of the single wheel caster 10 and the attachment of the support element 16 and the wheel 11 at one another.

FIG. 1 shows that the support element 16 is oriented for attachment purposes so that the support arms 17 are oriented towards the wheel hub N with their opposite attachment portions 19.

Figure 3:
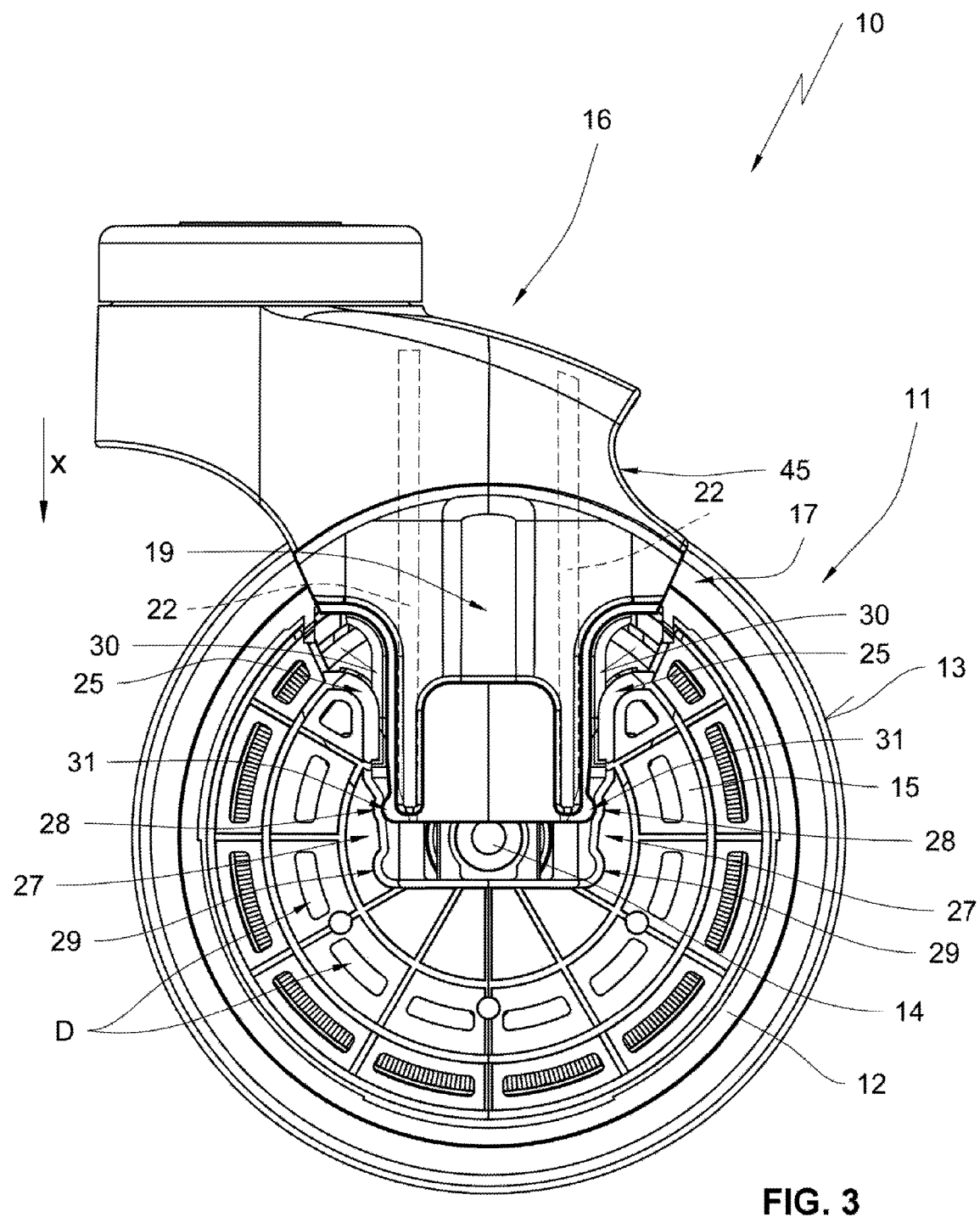
FIG. 3 illustrates a representation according to FIG. 1 with a support element that is partially arranged at the wheel.

Comparing FIGS. 1 and 3 shows that moving the support element 16 towards the wheel 11 the support bars arranged at the inner surfaces 21 are initially inserted on both sides into an intermediary cavity 32 between the support ribs 20 using the insertion bevels 23. This already provides an exact positioning of the opposite attachment portion 19 relative to the attachment portion 18. Further movement in insertion direction x (cf. FIG. 3) causes the interlocking surfaces 30 of the opposite attachment portion 19 to partially reach under the curved undercut portion 25 of the attachment portion 18, wherein the interlocking protrusions 31 are in the preliminary locking position 28 of the support contours 27.

Figure 4:
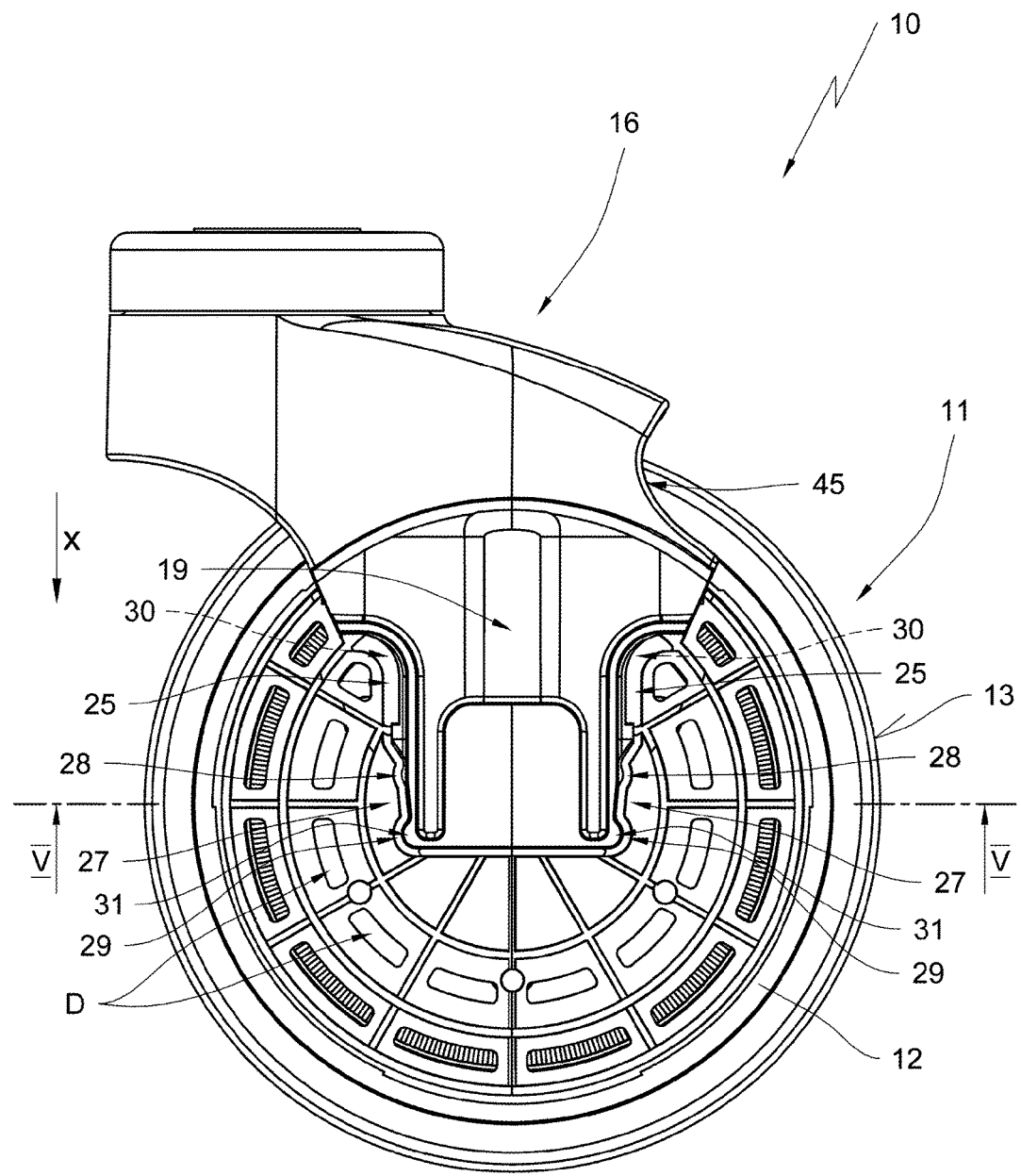
FIG. 4 illustrates a depiction according to FIG. 1 with a support element interlocked at the wheel.

Further movement of the support element 16 towards the wheel 11 yields the configuration according to FIG. 4 in which the interlocking protrusions 31 are already interlocked in the final interlocking position 29 and the interlocking surfaces 30 are arranged with large surfaces below the curved undercut portions 25.

Figure 5:
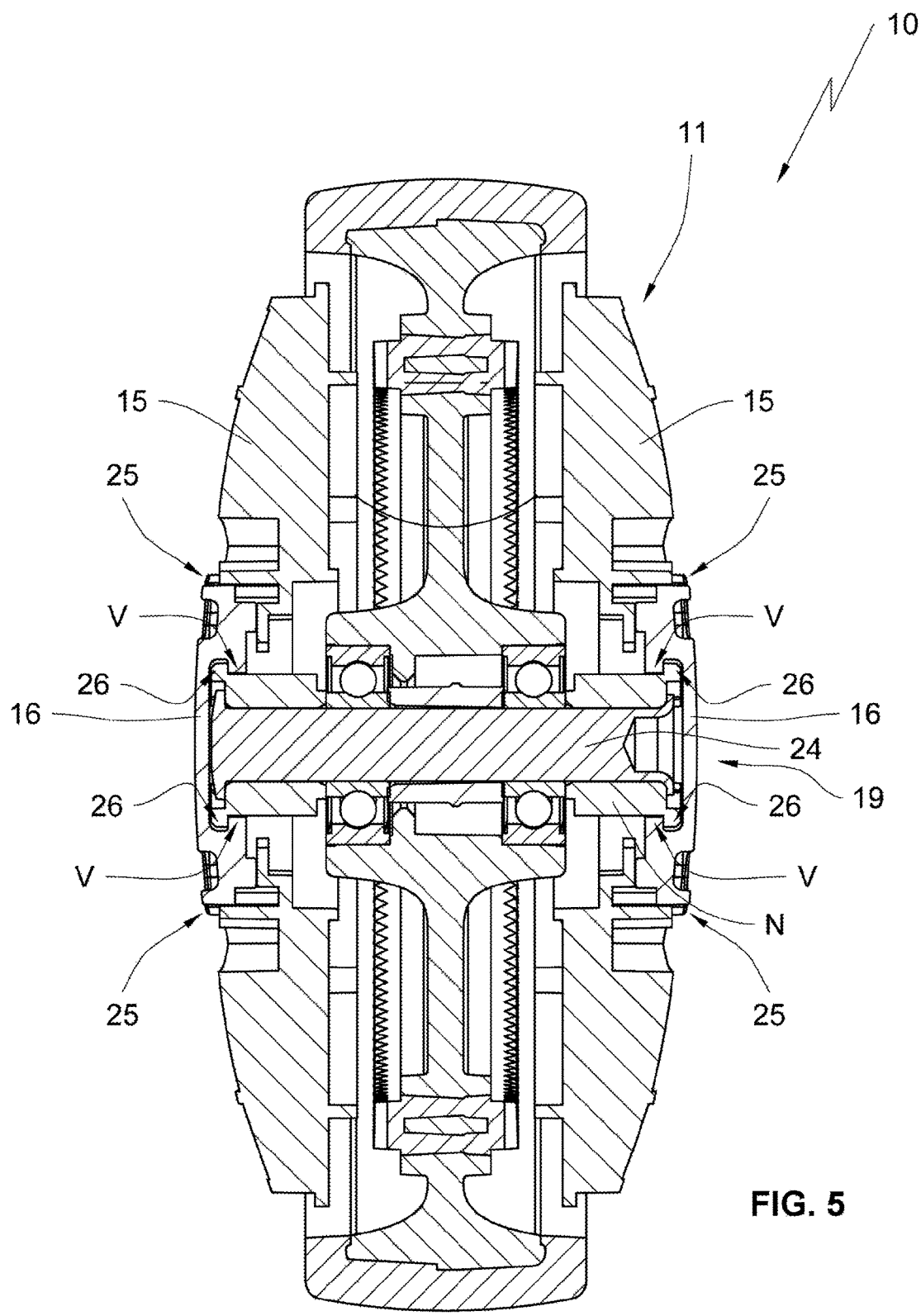
FIG. 5 illustrates a sectional view through the wheel axle and the wheel hub.

Additionally as evident from FIG. 5 the undercut portions 26 arranged on both sides of the wheel hub N are respectively undercut in an interlocking manner by the bar shaped protrusion V of the opposite attachment portion 19.

Due to the multiple form locking connection of each support arm 17 with the associated thread protector 15 in the portion of the two undercut portions 25 and of the two undercut portions 26 and due to the fact that the four undercut portions 25, 26 are respectively substantially offset from each other this yields a very stable load bearing connection between the support element 16 and the wheel 11.

Figure 6:
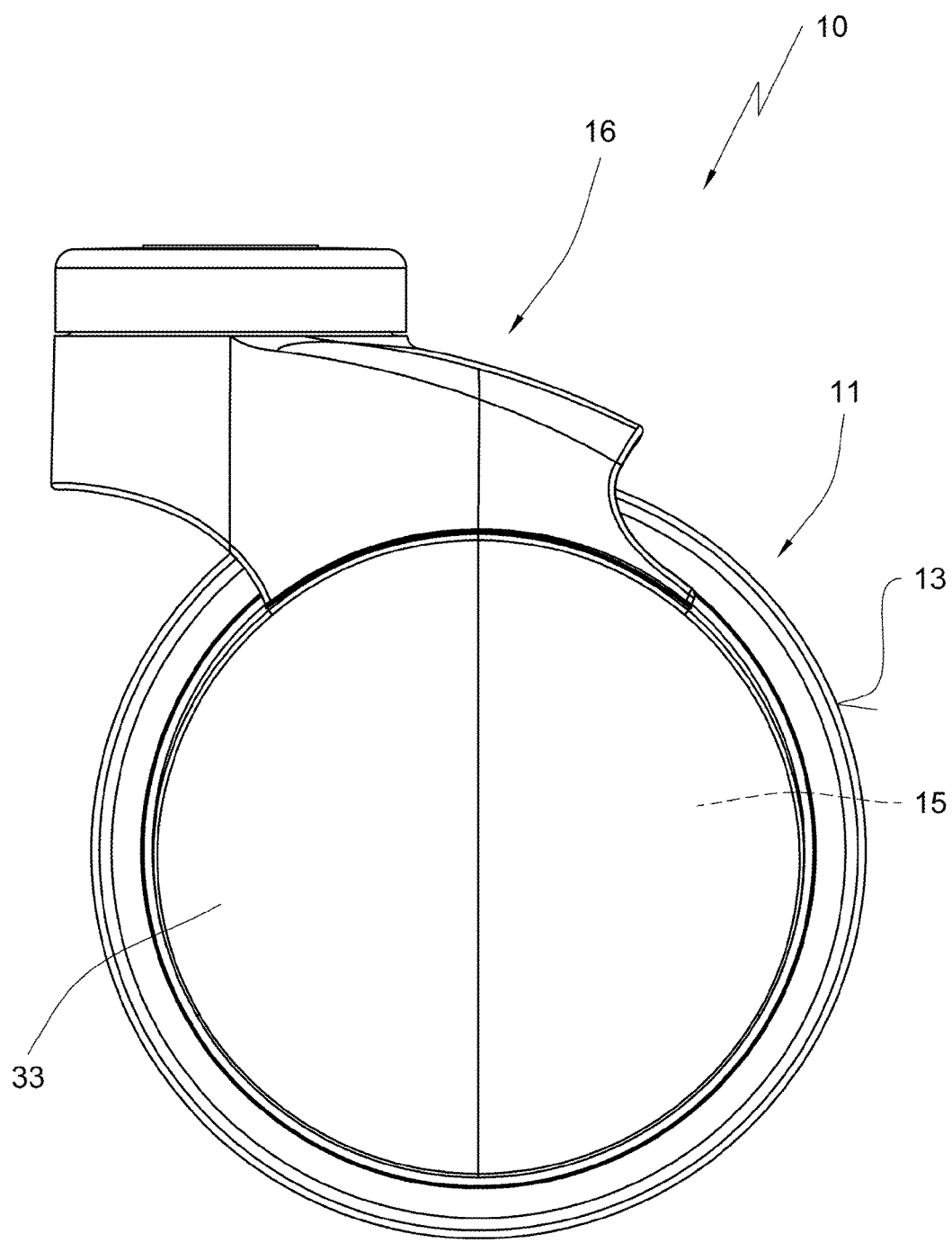

From FIG. 6 it is additionally apparent that an additional cover 33 can be attached at the thread protector after mounting the support element 16 and the wheel 11. Interlocking receivers are respectively fabricated into the support arms 17 in a non-illustrated manner wherein interlocking devices that are not illustrated and are arranged at an inside of the cover 33 can engage the interlocking receivers.

This additional arrangement of a cover 33 facilitates to configure the thread protector 15 as a structural component with plural pass through openings which greatly simplifies production of this component and reduces product costs wherein the function of the thread protector is still preformed in its entirety due to the combination with the cover 33.

FIGS. 7-10 further illustrate that the single wheel caster 10 described supra can be provided with a locking device 34. As apparent from FIG. 10 the locking device 34 is formed by a locking element 35 which includes a device for activating the directional locking device 36 and two devices for activating the wheel locking device 37.

Additionally the locking element 35 is provided with two interlocking protrusions 38 which are used for attaching a support 39. The support 39 includes two interlocking openings 40 where the recited attachment protrusions 38 interlock when attaching the support 39 at the locking element 35.

Additionally the support 39 includes interlocking protrusions 41 which are used for attaching a locking lever 42. The locking lever 42 is in turn provided with interlocking recesses 43 illustrate din dashed lines which facilitates a pivotable attachment of the locking lever 42 at the support 39 in a simple manner.

Figure 7:
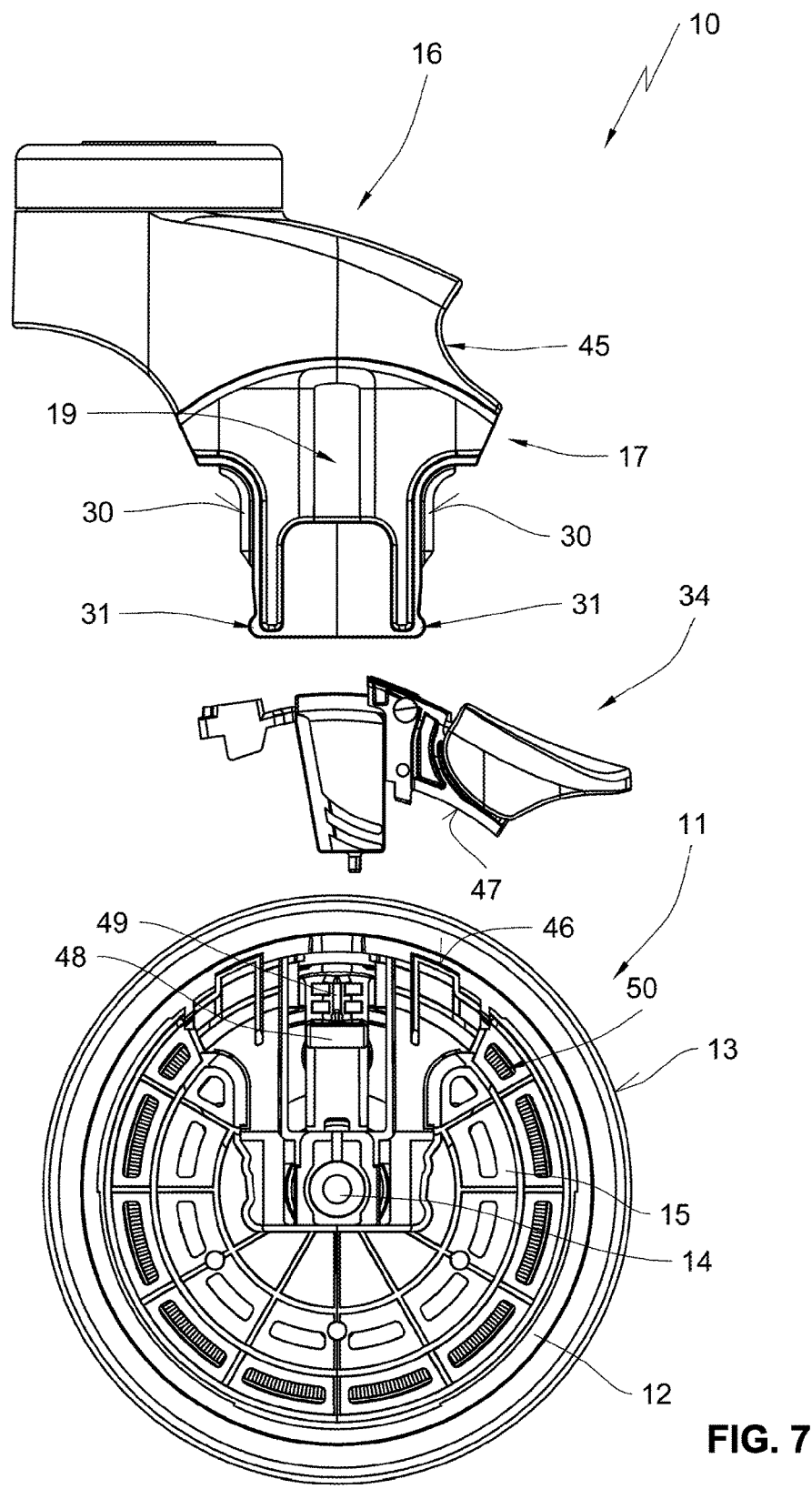
FIG. 7 illustrates an exploded view showing wheel locking device, support element and wheel.
Figure 9:
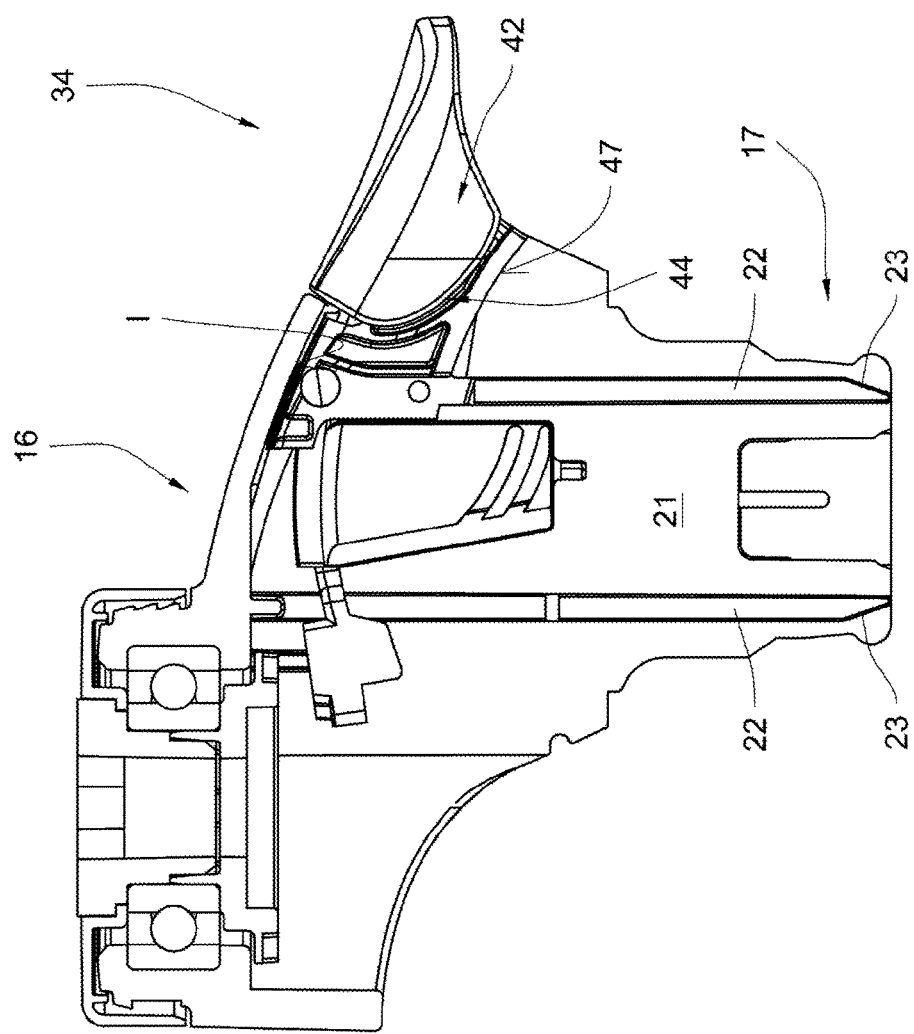
FIG. 9 illustrates a view according to FIG. 6 during assembly of the locking device.

The locking device 34 which is interlocked without additional fasteners and which is illustrated in FIG. 7 together with the support element 16 and the wheel 11 in an exploded view can now be positioned at the support element 16 without additional fasteners as well and in a simple manner. This process is illustrated in FIGS. 8 and 9.

Figure 10:
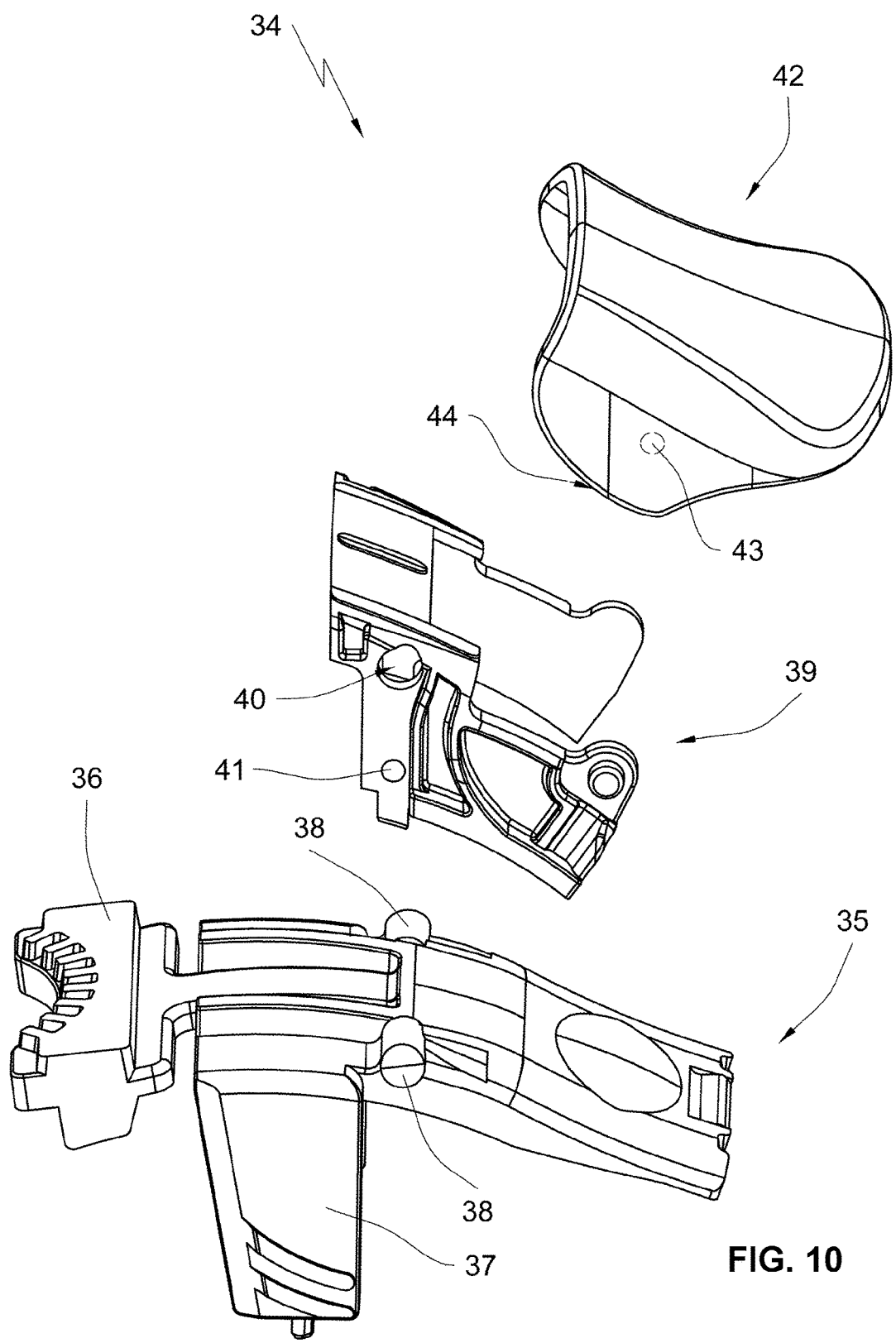
FIG. 10 illustrates an exploded view of the locking device.

It is evident from FIG. 8 that the locking device 34 is diagonally inserted into an interior of the support element 16 until both lower edges of the locking lever 42 respectively designated as 44 in FIG. 10 contact on both sides at an arcuate contour 45 of the support element 16 (c.f. FIG. 1). Thereafter an arcuate pivot movement y moves the locking device 34 with the lower edges 44 of the locking lever 42 along the arcuate contours 45 of the support element 16 until the locking device 34 is arranged in a predetermined end position (c.f. FIG. 9) in the support element 16.

In this context it is important, however, that the thread protector elements 15 additionally include two contact surfaces 46, wherein one respective contact surfaces as a function of a direction in which the locking device 34 is mounted at the wheel 11 interacts with the opposite contact surfaces 47 arranged at the locking device 34. This means in particular that the contact surfaces 46 of the thread protector 15 and the contact surfaces 47 of the locking device 34 contact each other with their entire surfaces after completing the insertion movement for attaching the support element 16 at the wheel 11, wherein the locking device 34 is fixated between an inner surface I of the support element and the contact surfaces 46 and 47. When actuating the locking lever 42, however, within certain limits a pivot movement of the locking element 35 including the device for actuating the directional locking device 36 and the device for actuating the wheel locking device 37 is feasible, wherein the support 39 is held in place. This pivot movement, however, is necessary so that on the one hand side the non illustrated directional locking device can be actuated in the support element 16 and on the other hand side the partially illustrated wheel brake can also be actuated.

Eventually as already recited supra the unit including the support element 16 and the locking device 34 can be disengageably interlocked in the same manner with the wheel 11.

In particular FIG. 7 illustrates a spring elastic lobe 48 that is cut clear on three sides and arranged in a center of the insertion portion of the thread protector 15, wherein the lobe is provided with a roof shaped actuation contour 49. On its back side the spring elastic lobe 48 includes a non-illustrated teeth portion which is arranged opposite to an annular teething 50 of the rim 12.

The locking device 34 is provided with a device for actuating the wheel locking device 37. The device 37 includes an actuation portion that is formed at a respective inner surface which is not illustrated wherein the actuation portion is arranged opposite to the roof shaped contour 49 in assembled condition. When actuating the locking lever 42 the locking element 35 is pivoted by a particular angular amount wherein the actuation protrusion acts against the roof shaped actuation contour 49 and presses the spring elastic lobe 48 with the non-illustrated teething portion arranged behind the spring elastic lobe 48 into the teething of the wheel rim 12. This provides a reliable wheel blocking.

Additionally the described pivoting of the locking device 34 causes the directional locking device 36 to pivot as well and to engage into the non-illustrated directional locking device after pivoting so that a directional fixation is provided as well.

REFERENCE NUMERALS AND DESIGNATIONS

- 10 single wheel caster
- 11 wheel
- 12 wheel rim
- 13 running surface
- 14 attachment rivet
- 15 thread protector
- 16 support element
- 17 support arm
- 18 attachment portion
- 19 opposite attachment portion
- 20 support ribs
- 21 inner surface support arm
- 22 support bars
- 23 insertion bevel
- 24 wheel axle
- 25 undercut portions (curved)
- 26 undercut portions (collar)
- 27 support contour (on both sides)
- 28 preliminary interlocking position
- 29 final interlocking position
- 30 locking surfaces of 19
- 31 interlocking protrusions
- 32 intermediary space
- 33 cover
- 34 locking device
- 35 locking element
- 36 actuation device for directional locking device
- 37 actuation device for wheel locking device
- 38 attachment protrusions
- 39 support
- 40 interlocking openings
- 41 interlocking protrusions
- 42 locking lever
- 43 interlocking recesses
- 44 lower edge of locking lever 42
- 45 arcuate contour of 16
- 46 contact surfaces of 15
- 47 contact surfaces of 34
- 48 spring elastic lobe
- 49 roof shaped actuation contour
- 50 teething at wheel rim
- x insertion direction
- y arcuate pivot movement
- N wheel hub
- V bar shaped protrusion
- I inner surface of 16
- D pass through openings

What is claimed is:

1. A single wheel caster, comprising:
   a support element including at least one support arm provided with a protrusion on each side of the at least one support arm and located at one end of the at least one support arm;
   a wheel including a rim, at least one hub for the wheel, a support contour, and a thread protector; and
   a locking device fixed between the wheel and the support element,
   wherein the rim is rotatably supported at the at least one hub and the thread protector attached to the at least one hub;
   wherein the support contour includes a bottom, a pair of sides and is formed on the thread protector,
   wherein the support contour extends below a lower edge of the at least one hub,
   wherein the pair of sides have a preliminary locking position able to interlock with the protrusion on each side of the at least one support arm,
   wherein the pair of sides have a final locking position able to interlock with the protrusion on each side of the at least one support arm,
   wherein the support contour has a top opening opposite to the bottom and the at least one support arm is insertable through the top opening in the support contour,
   wherein the locking device is fixed by form locking in an interior of the support element,
   wherein the form locking is provided directly between at least one inner surface of the support element and at least one contact surface of the thread protector,
   wherein the at least one contact surface of the thread protector is oriented radially outward with respect to the wheel,
   wherein the at least one contact surface of the thread protector contacts the locking device when the locking device is actuated or not actuated and the locking device does not move the thread protector when the locking device is actuated, and
   wherein a rotation of the wheel relative to the support element is prevented when the locking device is actuated.

2. The single wheel caster according to claim 1, wherein the locking device is formed by a wheel locking device or a directional locking device.

3. The single wheel caster according to claim 1,
   wherein the locking device includes
   a support that is fixed between the wheel and the support element,
   a locking element, and
   a locking lever,
   wherein the locking element and the locking lever are rotatably connected at the support by interlocking directly between the locking element and the support and by interlocking directly between the locking lever and the support.

4. The single wheel caster according to claim 3,
wherein support arms of the support element respectively include an arcuate-contour for engaging the locking device,
wherein the locking device is partially insertable into an interior of the support element within the arcuate contour, and
wherein the locking device is moveable into a predetermined end position by a pivot movement of the locking lever along the arcuate contour.

5. The single wheel caster according to claim 1, wherein the locking device is formed by a wheel locking device and a directional locking device.

6. The single wheel caster according to claim 1, wherein a support contour is elastic.

7. The caster according to claim 6,
wherein the support contour is formed at an outside of the thread protector,
wherein the support contour extends below a rolling axis of the wheel.

8. A single wheel caster, comprising:
a support element including at least one support arm with a locking surface and an interlocking protrusion;
a wheel including a rim, at east one hub for the wheel, a support contour, and a thread protector; and
a locking device fixed between the wheel and the support element,
wherein the rim is rotatably supported at the at least one hub about an axis of rotation and the thread protector attached to the at least one hub,
wherein the support contour includes a bottom and a pair of sides, is formed on the thread protector, and has a preliminary locking position for the at least one support arm and a final locking position for the at least one support arm,
wherein the support contour extends below a lower edge of the at least one hub, and
wherein the pair of sides is able to interlock with the interlocking protrusion on the at least one support arm at the preliminary locking position,
wherein the pair of sides is able to interlock with the interlocking protrusion on the at least one support arm at the final locking position,
wherein the support contour has a top opening opposite to the bottom and the at least one support arm is insertable through the top opening in the support contour,
wherein the locking device is fixed by form locking in an interior of the support element,
wherein the form locking is provided directly between at least one inner surface of the support element and at least one contact surface of the thread protector,
wherein the at least one contact surface of the thread protector is oriented radially outward with respect to the wheel, and
wherein the at least one contact surface of the thread protector contacts the locking device when the at least one support arm is in the final locking position.

* * * * *